June 22, 1965

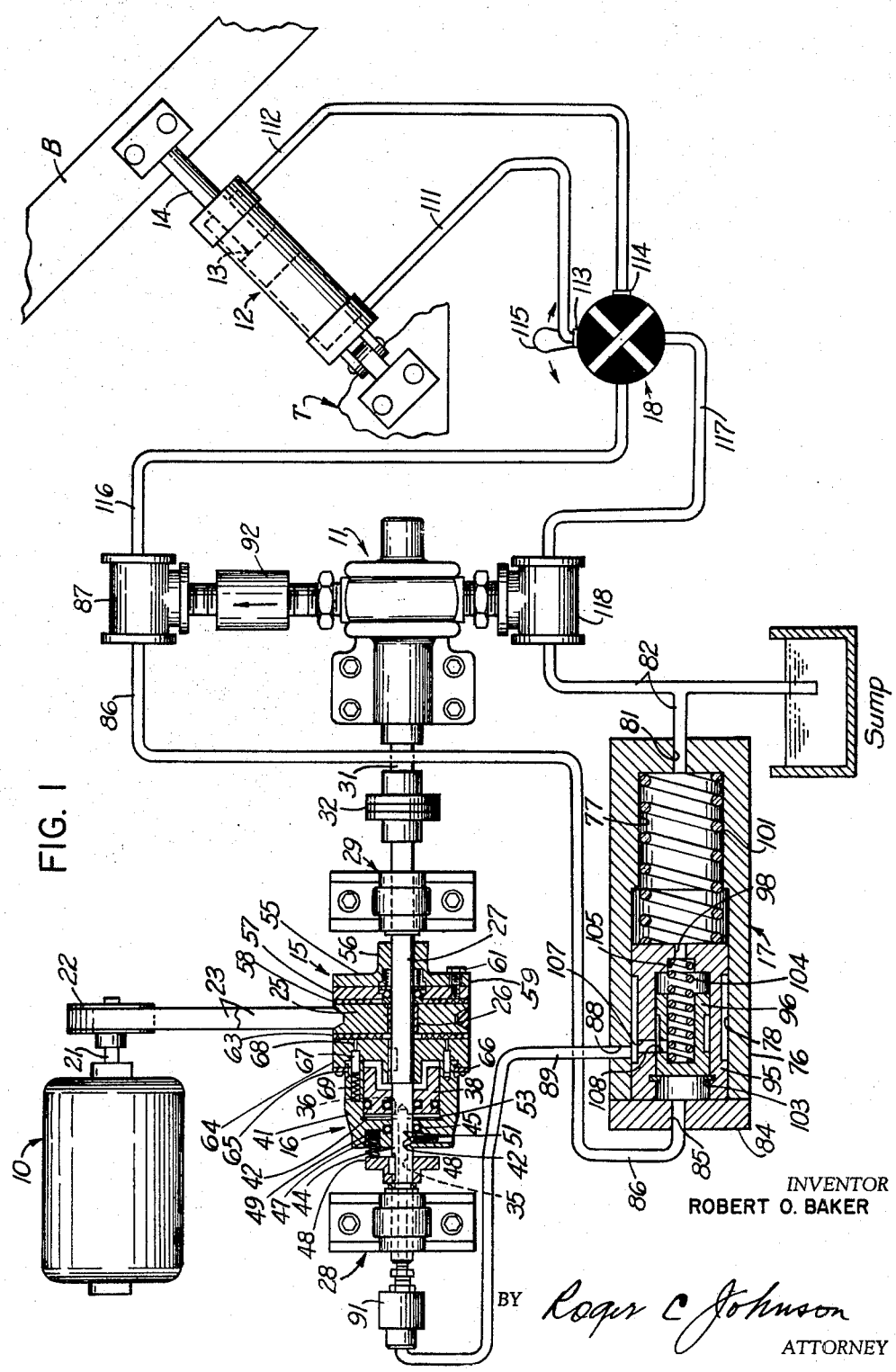

R. O. BAKER 3,190,073

AUTOMATIC VALVE AND CLUTCH ARRANGEMENT

Filed March 13, 1963

INVENTOR.
ROBERT O. BAKER
BY
Roger C. Johnson
ATTORNEY

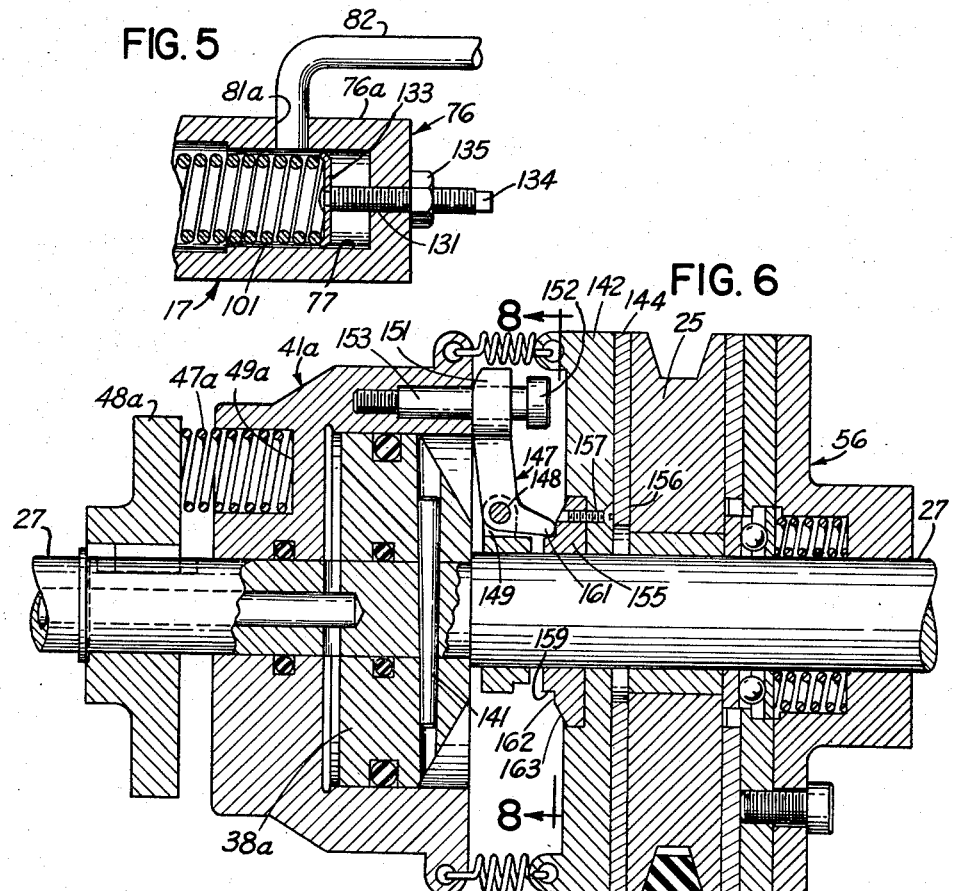

United States Patent Office 3,190,073
Patented June 22, 1965

3,190,073
AUTOMATIC VALVE AND CLUTCH
ARRANGEMENT
Robert O. Baker, Moline, Ill., assignor, by direct and mesne assignments, to Havaca, Inc., Moline, Ill., a corporation of Illinois
Filed Mar. 13, 1963, Ser. No. 264,911
18 Claims. (Cl. 60—52)

This application is a continuation-in-part of my co-pending application, Ser. No. 168,663, filed January 25, 1962, now abandoned, for Automatic Valve and Clutch Arrangement.

This invention relates generally to fluid pressure operated devices and the like and new and improved control means therefor.

The object and general nature of this invention is the provision of new and useful control means for fluid operated power units. For example, the present invention contemplates the provision of a clutch disposed between a pressure pump that is connected to actuate a pressure controlled power unit and a prime mover, with means for automatically operating the clutch to start and stop the pump in response to demands made on the power unit.

More specifically, it is a provision of this invention to provide a fluid pressure operated means, a valve for controlling the flow of pressure fluid to and from said means, a motor driven pump, a clutch between the motor and pump, and a clutch controlling means responsive to the operation of said valve for connecting and disconnecting said clutch. Still further, it is a feature of this invention to provide automatic clutch operating means deriving energy from the pump for controlling the clutch.

Another feature of this invention is the provision of new and improved means for completely disengaging the clutch with a positive action when employing a noncompressible hydraulic fluid in the system of this invention.

It is to be understood that the above mentioned fluid pressure operated means may be either pneumatic or hydraulic units, as desired. For example, an air tank or other source of air under relatively high pressure, or the like, may be used in place of a motor and hydraulic pump, although the latter may be preferred for many installations.

These and other objects and advantages of this invention will be apparent to those skilled in the art after a consideration of the following detailed description of the preferred structural embodiments, taken in conjunction with the accompanying drawings, in which:

FIG. 1 is a plan view of one form of this invention incorporating the principles of this invention, showing the parts in a position of rest.

FIG. 5 shows a modified form of this invention in which means is provided for increasing or decreasing the pressure normally developed in the system of this invention.

FIG. 6 is a view, somewhat similar to FIG. 2, showing a modified form of clutch operating means, showing the clutch in its engaged position.

FIG. 7 is a view similar to FIG. 6, showing the clutch in a disengaged position.

FIG. 8 is a sectional view taken along the line 8—8 of FIG. 6.

Figure 3:
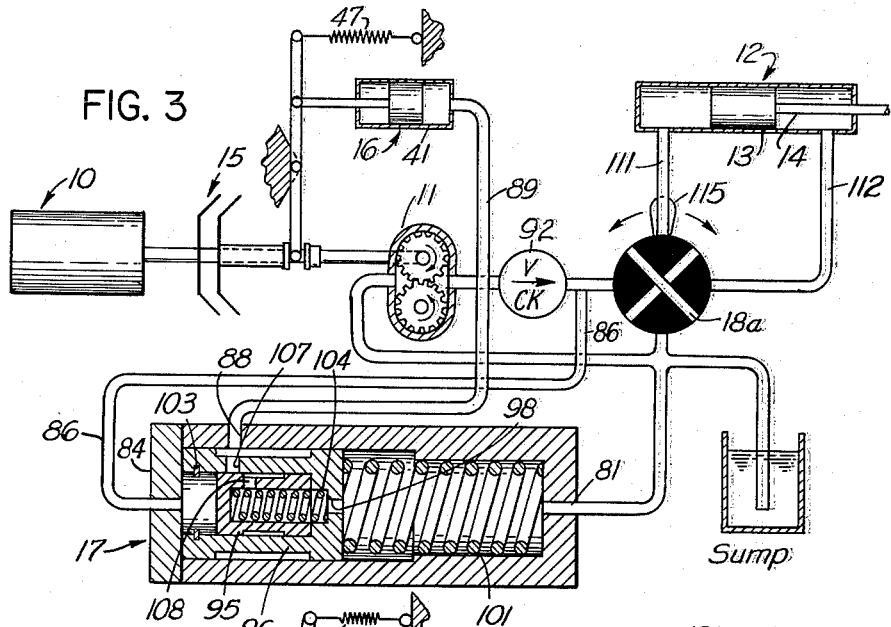
FIG. 3 is a diagrammatic view similar to FIG. 4 but showing the position of the parts after the prime mover has been started but with the automatic clutch control acting to hold the clutch disengaged so that the hydraulic pump is not driven.

The principles of this invention have been shown by way of illustration as incorporating a prime mover in the form of an electric motor 10, a gear type pump 11, a work member in the form of a fluid motor 12, which may take the form of a continuously rotating unit or a cylinder and piston device, as illustrated in FIG. 1 as including a piston 13 connected to a piston rod 14. The electric motor is connected to drive the pump 11 through a clutch 15 which is under the control of an expansible chamber means 16 and a special sequence valve 17, suitable hydraulic lines connecting the pump 11, the cylinder 12, the clutch means 15, 16 and the sequence valve 17. One practical embodiment of this invention may take the form of a hoist for the body of a dump truck driven from the engine of the truck by a valve in the cab of the truck. In FIG. 1 the valve controlling the flow of fluid to and from the cylinder 12 is shown at 18 and in this embodiment the motor 10 represents the engine of the truck.

Referring now to FIG. 1, the shaft 21 of the motor 10 carries a drive pulley 22 over which a V-belt 23 is trained. The belt 23 is also trained over a driven pulley 25 freely rotatable, as by a bearing 26, on a shaft 27 supported at its ends on stationary bearings 28 and 29. The shaft of the gear pump 11 is shown at 31 and the shaft 31 is connected to the shaft 27 by a flexible coupling 32.

Figure 2:
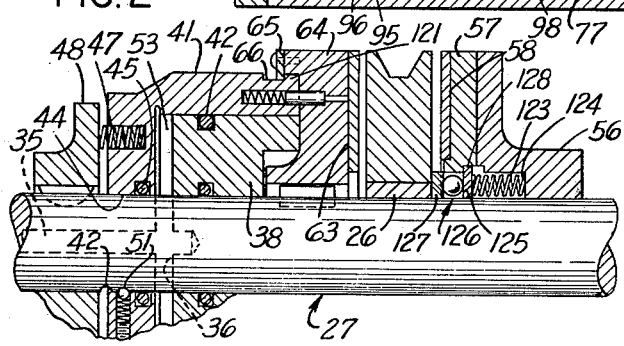
FIG. 2 is a fragmentary view showing at an enlarged scale a portion of the clutch controlling means.

The other end of the shaft is drilled axially, as at 35, the axial bore 35 extending from the left end (FIG. 1) of the shaft 27 to a transverse outlet 36, FIG. 2, drilled in the shaft 27 just outside a cylindrical hub member 38 fixed to the shaft 27. The expansible chamber 16 mentioned above includes a cylinder 41 having an open end embracing the hub 38 and sealed by an O-ring 42 seated in a groove formed in the hub 38. The other end of the cylinder 41 is closed except for an opening 44 through which the shaft 27 passes, sealed by an O-ring 45. The cylinder 41 is slidable on the shaft 27 and is urged toward the right (FIG. 1) by a plurality of springs 47 that bear at their outer ends against a collar 48 fixed to the shaft 27. The inner end of each of the springs 47 seats in a recess 49 formed in the outer end of the cylinder 41. A ball detent unit carried by the outer end of the cylinder 41 coacts with a pair of recesses 43 formed in the shaft 27 to releasably hold the cylinder 41 in either of two positions, the ball of the unit 51 being spring pressed and yieldable to permit movement of the cylinder 41 along the shaft 27. The innermost position of the cylinder 41 is shown in FIG. 1 but in this position there is an interior space 53 forming a chamber communicating with the cross bore 36.

The clutch 15 mentioned above is controlled by movement of the cylinder 41 relative to the hub 38, which is fixed to the shaft 27. The clutch 15 includes, in addition to the driven pulley 25, a collar 55 having a hub 56 that is fixed to the shaft 27, and a clutch plate 57 carrying a friction ring 58. The plate 57 is fixed to the flange 59 of the collar 55 by screws 61. Disposed at the other side of the driven pulley 25 is a second friction ring 63 that lies between the driven pulley 25 and a pressure plate 64 that is connected for limited movement relative to the cylinder 41 by ring means 65 having radially inner portions lying in a groove 66 formed in the inner end of the cylinder 41 and releasably secured to the innermost peripheral edge of the pressure plate 64. Spring pressed plungers 67 are carried by the cylinder 41 and includes, ends 68 that engage the inner surface of the friction ring 63 and springs 69 that bear against the inner end of the bores 71 for urging the pressure plate 64 to the right as viewed in FIG. 1. The friction rings 58 and 63 are fixed in any suitable manner to the associated parts 57 and 64.

The engagement and disengagement of the clutch 15 is under the control of suitable means which includes a sequence valve 17 that will now be described.

The valve unit 17 includes a generally cylindrical casing 76 having a hollow interior formed of two cylindrical sections 77 and 78 of different diameters. A port 81 in the end of the smaller section connects into a sump line 82 leading to the inlet of the hydraulic pump 11. The other end of the casing 76 is closed by a plate 84 in which is a port 85 that is connected to the high pressure line 86 and the latter is connected with the high pressure side or outlet of the pump. A port 88 is formed in one side of the casing 76 and is connected to line 89 that leads to the bore 35 through a rotatable fitting 91. A check valve 92 which permits flow in the direction of the arrow adjacent thereto is disposed between the outlet fitting 87 and the body of pump 11.

Two sleeves 95 and 96 are disposed within the casing 76. The outer sleeve 95 is movable in the interior section 78 of larger diameter and is open at one end and closed at the other end except for a port 98 that communicates with the smaller interior section 77. A relatively heavy spring 101 seats in the bottom of the casing section 77 surrounding the port 81 and the opposite end of the spring 101 bears against the end of sleeve 95 having the port 98. The other sleeve 96 is disposed within the interior of sleeve 95 and is held in place by a snap spring 103. A spring 104 is disposed within the hollow portion of sleeve 96 and seats in a shouldered portion 105 formed in the end of sleeve 95 having the port 98. When the springs 101 and 104 are fully extended, with the outer end of sleeve 95 lying against the end plate 84 of the casing 76 and the outer end of sleeve 96 lying against the snap ring 103, the side ports 107 and 108 in the sleeves 95 and 96 are in alignment with each other and with the port 88 to which the line 89 is connected.

The fluid motor 12 preferably is of conventional construction, comprising a double acting cylinder having closed ends from which fluid lines 111 and 112 extend to connections 113 and 114 on the valve unit 18. The latter also is of conventional construction and includes ports, passageways, and the like, and a ported valve member controlled by a valve handle 115. A line or conduit 116 leads from the valve unit 18 to the high pressure pump fitting 87. A low pressure line 117 leads from the valve unit 18 and connects with the sump line 82 and the inlet fitting 118 of the pump.

The operation of the mechanism described above is as follows.

FIG. 1 shows all of the parts in their non-operating or shut off position. That is, the prime mover 10 is shut off, the clutch is engaged by virtue of the action of the clutch springs 47, the interior of the chamber 53 being connected with the sump line 82 through passageways 36, 35, line 89, ports 107, 108, and 98, chamber 77 and port 81, but the pump is not in operation and the valve unit 18 is shut off so that no fluid may flow to or from the work cylinder or fluid motor 12.

When it is desired to set the apparatus in operation, the motor 10 is started and since the clutch 15 is engaged the pump 11 is driven. However, since the valve unit 18 is closed no fluid flows to the fluid motor 12; instead, pressure builds up in line 86 and this forces both sleeve 95 and sleeve 96 toward the right (FIG. 1) against the force exerted by the springs 101 and 104 until the port 88 is uncovered. Then fluid under pressure is directed through line 89 to the fitting 91, and through the bores 35 and 36 to the chamber 53, moving the cylinder 41 to the left (FIG. 1), thus disengaging the clutch. When the clutch 15 is disengaged the pump stops but fluid is locked in the lines 86 and 89 and in the cylinder 41 by the check valve 92, which prevents fluid from flowing back to the pump, except for a slight amount that occurs during the closing movement of the check valve 92. This small amount is sufficient, however, to permit the relatively heavy spring 101 to move the sleeve 95 to the left (FIG. 1) and close over the port 88, but the pressure in the line 86 remains sufficient to keep the sleeve 96 in the bottom of the sleeve 95, thus closing port 108 as illustrated in FIG. 3 so that fluid is locked in chamber 53 which holds the clutch 15 disengaged. Thus, the motor 10 is operating but under no load, while the clutch 15 is held disengaged.

In order to prevent unnecessary wear of the clutch facings or friction rings 58 and 63 when the clutch is held in disengaged position while the motor 10 continues to rotate under no load, I provide means acting to hold the driven pulley 25 in a midposition between the facings 58 and 63, as illustrated in FIG. 2. When fluid under pressure from the line 89 is forced into the expansible chamber 53 the cylinder 41 is shifted to the left (FIGS. 1 and 2) and in so moving a ridge 121 adjacent the groove 66 engages the ring means 65 and pulls the pressure plate 64 to the position shown in FIG. 2. At the same time springs 123 disposed in recesses 124 formed in the hub 56 act against the ring 125 of a thrust bearing 126, the other ring 127 of which is pressed against the adjacent face of the pulley 25 and the associated bushing 26. This movement is limited by contact between the ring 25 and a shoulder 28 on the clutch plate 57, as shown in FIG. 2. Thus, the driven pulley 25 may rotate freely without dragging on adjacent parts.

Thus, the apparatus of this invention as described above and illustrated schematically in FIG. 3, with motor turning over but delivering no power, stands ready to actuate the fluid motor 12 as soon as the valve handle 115 is moved in one direction or the other, according to whether it is desired to extend or retract the fluid motor 12.

Figure 4:
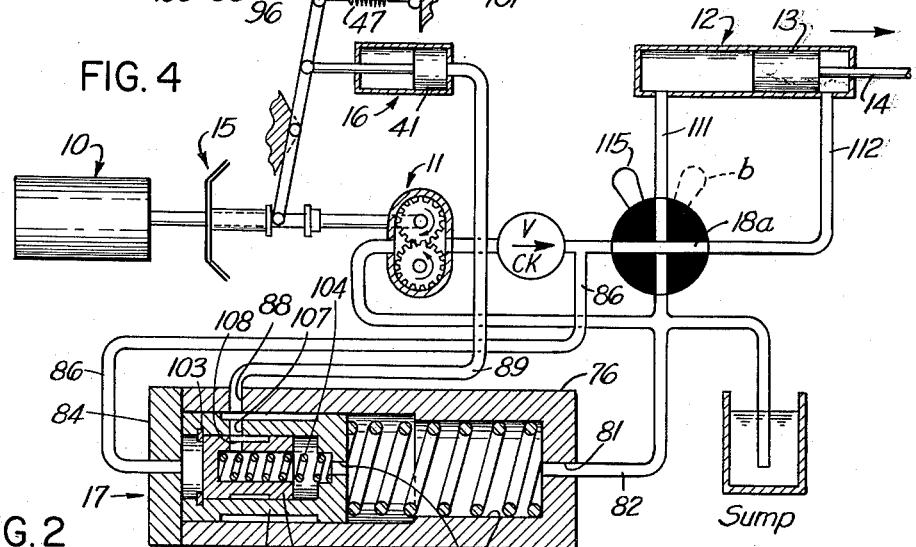
FIG. 4 is a view similar to FIG. 3 showing the position of the parts in which opening of the hydraulic lines serve to release enough fluid from the high pressure pump line so as to permit fluid to flow out of the clutch control cylinder and the clutch to engage, thus driving the pump and operating the work cylinder.

Referring now to FIG. 4, assume that the valve handle 115 has been turned to bring the fluid line 112 into communication with the high pressure pump line 116 through the valve port 18a. There is a pressure drop in the line 86 and the spring 104 shifts the inner sleeve 95 to the left to the position shown in FIG. 4. This opens the line 89 to the sump line 82 through the aligned ports 88, 107 and 108, interior of the sleeve 96, and ports 98 and 81. Fluid then drains from cylinder 41 and the springs 47 act to engage the clutch members 58 and 63 with the pulley 25, which is constantly driven by the pulley 22, thus acting to drive the pump 11 and extend the fluid motor 12. As illustrated in FIG. 1, for example, the ram or fluid motor 12 may be connected to raise and lower the bed B of the truck T, moving the handle 115 to the position shown in full lines in FIG. 4 serving to retract the fluid motor 12. Moving the handle to the opposite position b (FIG. 4) serves to extend the fluid motor 12.

When the fluid motor 12 reaches the desired position, the operator moves the valve handle 115 to its center or closed position (FIG. 3), which cuts off further fluid flow to and from the motor 12. Pressure is then built up in the line 86 which forces the sleeves 95 and 96 to the right (FIG. 3). This opens the port 88 to the pump pressure and thus fluid is delivered to the clutch cylinder 41, overcoming the springs 47 and disengaging the clutch. The ball detent units 51 provide means serving to define definite clutch engaging and clutch disengaging positions for the cylinder 41.

When the fluid motor 12 reaches the end of its stroke the clutch will be automatically disengaged in the same manner as described above when the valve handle 115 is shifted to the closed position.

It will be clear from the above description that more than one fluid motor and its valve unit 18 may be actuated by the motor 10 and clutch control, if desired, the number of fluid motor units depending on the capacity of the pump and sump.

It will also be clear that the piston 12 may be of any length necessary, the greater the length of piston the larger the capacity required for the sump. Also, the unit 12 (FIG. 3) may be in the form of a gear pump or other continuously rotating mechanism, in which case the exhaust should be arranged to be delivered back to the sump in order that there will always be ample supply of fluid for the pump 11.

As will be seen from FIG. 1, the force exerted by the spring 101 determines the maximum pressure that will be exerted on the unit 12. If desired, and as indicated in FIG. 5, the spring 101 may be made adjustable by connecting the line 82 into port 81a formed in a side wall 76a of the cylinder 76, and providing a screw-threaded member 131 which includes a section screwed into a threaded opening in the end of casing 76. The member 131 carries a revoluble seat 133 receiving the spring end 101. The outer end of the member 131 is squared, as at 134, and a lock nut 135 is provided for retaining the member 131 in selected position of adjustment. Thus, the effective tension exerted by the spring 101 may be varied as desired. The greater the pressure exerted by the spring 101, the greater the pressure available to operate the unit 12.

It will be clear that, while I have described the preferred form of this invention as embodying a hydraulic system including a sump, low pressure lines and the like, the principles of this invention may be incorporated in a system using air pressure rather than hydraulic pressure, in which case the surrounding atmosphere may serve the same purpose or function as the low pressure or sump line, including the sump itself.

In FIGS. 6 and 7 I have shown a modified form of clutch which performs its clutch-engaging and clutch-disengaging action with an improved positive action, and is therefore an improvement over the ball detents 51, shown in FIG. 2, particularly when using a non-compressible hydraulic fluid.

Referring first to FIG. 6, in this form of the invention the cylindrical hub member 38a is pinned to the shaft 27, as at 141, and is spaced a considerable distance from a pressure plate 142 that is similar to pressure plate 64 described above, having a clutch facing 144 secured thereto. The pressure plate 142 is axially shiftable on shaft 27 but is held, as by a key or the like, against rotation relative thereto. The cylinder 41a is provided with a plurality of recesses 49a in which springs 47a are seated. The other ends of the springs 47a bear against a collar 48a that is fixed to the shaft 27.

Disposed between the pressure plate 142 and the cylinder 41a is a plurality, preferably three, of bell-crank levers 147, each swingably mounted by a pivot pin 148 on a pair of apertured lugs 149 fixed to a collar 151 fixed in any suitable way to the shaft 27. Each lever 147 has a radially outwardly extending bifurcated end 151 embracing an associated stud 153 fixed to the cylinder 41a, there being a space between the end 151 and the head 152 of the stud 153. The other end of each lever 147 extends axially toward the pressure plate 142 and is formed with a rounded portion adapted to bear against a hardened wear collar 155 fixed by screws 156 in a recess 157 formed in the radially inner face of the pressure plate 142. The wear plate 155 has a shouldered portion 159 that lies substantially directly opposite the lever pivot 148. Adjacent the shouldered portion 159 immediately radially outwardly thereof is a flat surface lying in a radially outwardly extending plane. When the levers 147 are in the position shown in FIG. 6, with the cylinder 41a being held in the right hand position by the springs 47a, the rounded ends 161 are held against the shoulder 159 and bear against the radial face 162. Radially outward of the flat face 161 the wear plate 155 has a conical portion 163 which provides a space S into which the rounded ends 161 may move to permit the pressure plate 142 to move away from the power driven pulley 25, thus disengaging the clutch.

The cylinder 41a is moved axially back and forth in the manner described above in connection with the form of the invention shown in FIGS. 1–4. When fluid is directed into the clutch to disengage the clutch the levers 147, the cylinder 41a and levers 147 take the positions shown in FIG. 7. It will be noted that the clutch is held engaged with a positive action when the springs 47a act through the cylinder 41a to force the rounded 161 down against the flat surface 162. This is a slightly overcenter position so that the clutch is positively held engaged even though there should be a small leakage flow of fluid into the cylinder 41a.

Having described my invention, what I claim and desire to secure by Letters Patent is:

1. In a power transmission system, a hydraulic motor forming a fluid pressure operated work element, a hydraulic pump, a first hydraulic circuit including a control valve connecting said work element with said pump, a check valve incorporated in said hydraulic circuit to prevent flow of fluid from said work element through said control valve to said pump, a prime mover, clutch means connecting said prime mover with said pump, means biasing said clutch for movement to an engaged position, fluid pressure means operative to overcome said bias and disengage said clutch, a second hydraulic circuit connected with said first hydraulic circuit between said check valve and said control valve for directing fluid under pressure to said fluid pressure means to disengage said clutch in response to high pressure between said check valve and said control valve, and valve means incorporated in said second hydraulic circuit and responsive to a drop in pressure in portions of said first hydraulic circuit for relieving pressure in said fluid pressure means so as to permit said biasing means to engage said clutch.

2. In a power transmission including a prime mover, a hydraulic pump, a clutch disposed between said prime mover and said pump, a hydraulic motor, a hydraulic circuit means connecting said pump with said motor and including a valve, the improvement comprising expansible chamber means connected with said clutch and operative to shift said clutch to disengaged position, a first fluid line leading to said expansible chamber, a second fluid line connected with the high pressure side of said pump, a low pressure line, and valve means connecting said first and second lines and said low pressure line and responsive to pressure in said second line to move said valve means into position diverting fluid flow from said second fluid line to said first fluid line to direct fluid under pressure to said expansible chamber.

3. The invention set forth in claim 2, further characterized by said last mentioned valve means including a casing having one port receiving said first fluid line and thereby communicating with said expansible chamber, a second port communicating with said second fluid line, and movable valve members within said casing and controlling the flow of pressure fluid from said second fluid line and said expansible chamber and the flow of fluid from said expansible chamber to said low pressure line.

4. The invention set forth in claim 3, further characterized by spring means acting against said valve members for moving them to a position placing said first fluid line in communication with said low pressure line, said spring means being yieldable to pressure in said second line when said pump operates with said valve means in said hydraulic circuit closed, so as to open said first fluid line to pressure in said second fluid line.

5. The invention set forth in claim 4, further characterized by said valve means including a casing having first, second and third ports, means connecting said first and second ports with said first and second fluid lines, respectively, means connecting said third port with said low pressure line, an outer valve sleeve movable axially in said casing and including a port movable into and out of alignment with said first port in said casing, an inner valve sleeve movable axially within said outer sleeve and having a port movable into and out of alignment with said outer sleeve port, spring means carried within said casing and reacting against said outer sleeve and said casing for urging said outer sleeve to a position placing the outer sleeve port and said first casing port in alignment, a second spring means acting against said outer valve sleeve and said inner valve sleeve for urging said inner valve sleeve into a position aligning the ports in said inner and outer valve sleeves, and means placing said aligned ports in the valve sleeves and said casing in communication with said low pressure line.

6. In a power transmission system, a hydraulic motor forming a fluid pressure operated work element, a hydraulic pump, a first hydraulic circuit means including a control valve connecting said work element with said pump, a check valve incorporated in said hydraulic circuit means to prevent flow of fluid from said work element through said control valve to said pump, a prime mover, clutch means connecting said prime mover with said pump, means biasing said clutch for movement to an engaged position, fluid pressure means operative to overcome said biasing means and disengage said clutch, a second hydraulic circuit means connected with said first hydraulic circuit means between said check valve and said control valve for directing fluid under pressure to said fluid pressure means to disengage said clutch in response to high pressure between said check valve and said control valve, hydraulic cylinder means connected with said clutch and operative when extended to disengage said clutch, and means responsive to a flow of fluid from between said check valve and said control valve for causing fluid to flow from said hydraulic cylinder and the associated clutch to engage the latter and drive said pump.

7. In a power transmission including a prime mover, a hydraulic pump, a clutch disposed between said prime mover and said pump, a hydraulic motor, hydraulic circuit means connecting said pump with said motor and including a valve, and means biased to move said clutch to an engaged position, the combination therewith of a cylinder and piston unit connected to act against said bias to disengage said clutch, a first valve means operative to lock fluid in said cylinder to hold said clutch disengaged, and means including a second valve means to shift said first valve means and substantially empty said cylinder to permit said biasing means to engage said clutch.

8. In a power transmission including a prime mover, a hydraulic pump, a clutch disposed between said prime mover and said pump, a hydraulic motor, hydraulic circuit means connecting said pump with said motor and including a control valve, a check valve, the improvement comprising expansible chamber means connected with said clutch and operative to shift said clutch to disengaged position, means including a valve shiftable into a position to lock fluid in said expansible chamber, and means responsive to closing of the check valve for shifting said shiftable valve into a position preventing fluid flow from said expansible chamber, and means responsive to opening of said control valve to provide a flow of fluid from said expansible chamber to cause said clutch to engage.

9. In a power transmission including a prime mover, a hydraulic pump, a clutch disposed between said prime mover and said pump, a hydraulic motor, hydraulic circuit means connecting said pump with said motor and including a control valve, a check valve, the improvement comprising expansible chamber means connected with said clutch and operative to shift said clutch to disengaged position, means responsive to closing of the check valve to lock fluid in said expansible chamber, and means responsive to opening of said control valve to provide a flow of fluid from said expansible chamber to cause said clutch to engage, said clutch including a part connected to be driven from said prime mover, a second part shiftable toward and away from said first part, and locking means acting to hold said second part against said first part until said chamber means has moved through a predetermined distance.

10. In a power transmission system, a constantly operable prime mover, a fluid pressure pump, a clutch disposed between said prime mover and said pump, a fluid pressure motor, fluid pressure circuit means connecting said pump with said motor and including a valve, the improvement comprising expansible chamber means connected to operate said clutch and shift the same to disengaged position, a fluid circuit connected between said expansible chamber and said pump and including two ports, relatively movable parts carrying said ports in adjacent relation and shiftable one relative to the other to bring said ports into alignment with one another when the pressure between said pump and said fluid pressure motor is reduced.

11. The invention set forth in claim 10, further characterized by a sump, a sump line connected between said sump and the suction side of said sump, and means connecting said ports when aligned with said sump line.

12. The invention set forth in claim 11, further characterized by means responsive to a drop in pressure between said pump and valve for opening said ports.

13. In a power transmission system, a constantly operable prime mover, a fluid pressure pump, a clutch disposed between said prime mover and said pump, a fluid pressure motor, fluid pressure circuit means connecting said pump with said motor and including a valve, expansible chamber means connected to shift said clutch, a first circuit means connecting said chamber means with the high pressure side of said pump, a sump line, a second circuit means arranged to connect said first circuit means with said sump line, and valve means interconnected with said first and second circuit means for controlling the flow of fluid into and out of said expansible chamber.

14. In a power transmission including a prime mover, a pump, a clutch disposed between the prime mover and said pump, a fluid operated work unit, and circuit means including a check valve and a control valve serially arranged between said pump and said work unit, the improvement of a fluid pressure operated means connected to operate said clutch comprising a pressure plate, shaft means on which said pressure plate is movable, a cylinder disposed adjacent said plate and shiftable axially relative to said shaft means, bell crank means carried by said shaft means and connected between said cylinder and said clutch for operating said pressure plate, and means connecting said cylinder to the circuit means for effecting shifting of the pressure plate.

15. In a power transmission including a prime mover, a pump, a clutch disposed between the prime mover and said pump and including a pressure plate, a shaft connected to drive said pump, a motor driven member mounted on said shaft and constituting the driven part of said clutch, a second pressure plate, both of said pressure plates being mounted on and rotatable with said shaft and said first mentioned plate being shiftable axially relative to said second plate, said motor driven member being disposed axially between said plates, spring means connected to urge said pressure plates to drivingly engage said motor driven member, and fluid pressure means carried by said shaft and connected to shift said first pressure plate away from said motor driven member.

16. In a power transmission including a prime mover, a hydraulic pump, a clutch disposed between said prime mover and said pump, a hydraulic motor, hydraulic circuit means connecting said pump with said motor and including a valve, and means biased to move said clutch to an engaged position, the combination therewith of clutch operating means connected with said clutch comprising a cylinder and piston unit connected to act against said bias to disengage said clutch, means connected with said unit for locking fluid in said unit to hold said clutch disengaged, and means responsive to a lowered pressure at the discharge end of said pump for releasing the fluid in said unit to permit said biasing means to engage said clutch.

17. In a power transmission including a prime mover, a hydraulic pump, a clutch disposed between said prime mover and said pump, a hydraulic motor, hydraulic circuit means connecting said pump with said motor and including a valve, and means biased to move said clutch to an engaged position, the combination therewith of clutch operating means connected with said clutch comprising a cylinder and piston unit connected to act against said bias to disengage said clutch, valve means operative to lock fluid in said cylinder to hold said clutch disengaged, and means responsive to a drop in pressure in said circuit means to shift said last mentioned valve means to a position permitting said cylinder to shift and permit said biasing means to engage said clutch.

18. In a power transmission including a prime mover, a hydraulic pump, a clutch disposed between said prime mover and said pump, a hydraulic motor, hydraulic circuit means connecting said pump with said motor, and means biased to move said clutch to an engaged position, the combination therewith of clutch operating means connected with said clutch comprising a cylinder and piston unit connected to act against said bias to disengage said clutch, and pressure responsive means connected to be responsive to pressure in said hydraulic circuit means for shifting said clutch against said biased means into its disengaged position, said pressure responsive means including means for adjusting the amount of pressure to which said pressure responsive means responds when disengaging said clutch.

References Cited by the Examiner
UNITED STATES PATENTS

| | | |
|---|---|---|
| 635,848 | 10/99 | Dutton. |
| 1,049,332 | 1/13 | Bowser _____ 192—91 X |
| 1,086,738 | 2/14 | Thompson et al. _____ 60—57 |
| 2,210,665 | 8/40 | Harrington _____ 60—52 |
| 2,323,519 | 7/43 | Dean _____ 60—60 |

JULIUS E. WEST, *Primary Examiner.*

EDGAR W. GEOGHEGAN, *Examiner.*